United States Patent [19]

Thorn

[11] Patent Number: 4,822,010

[45] Date of Patent: Apr. 18, 1989

[54] FLUID FILLED RESILIENT BUSHING

[75] Inventor: Richard P. Thorn, Erie, Pa.

[73] Assignee: Lord Corporation, Erie, Pa.

[21] Appl. No.: 102,947

[22] Filed: Sep. 30, 1987

[51] Int. Cl.⁴ .............................................. F16F 9/34
[52] U.S. Cl. .................................. 267/140.1; 267/219
[58] Field of Search ................... 188/280, 320, 322.13; 248/562; 267/219, 220, 140.1

[56] References Cited

U.S. PATENT DOCUMENTS 3,147,964 9/1964 Wolf.
3,642,268 2/1972 Hipsher.
4,700,934 10/1987 Andrä et al. ...................... 267/140.1

FOREIGN PATENT DOCUMENTS 0164887 12/1985 European Pat. Off. ......... 267/140.1
56-63141 5/1981 Japan.
0206838 9/1986 Japan .............................. 267/140.1

OTHER PUBLICATIONS

Wallace C. Flower, "Understanding Hydraulic Mounts for Improved Vehicle Noise, Vibration and Ride Quality", 5/15/85.
Marc Bernuchon, "A New Generation of Engine Mounts", SAE Technical Paper Series, 840259, 2/27/84.

Primary Examiner—Duane A. Reger
Attorney, Agent, or Firm—Philip P. McCann; James W. Wright

[57] ABSTRACT

A fluid filled resilient bushing assembly for vibration control, particularly adapted for use in supporting a torque strut or an automobile suspension system, which comprises an elongate inner rigid member and a elongate outer rigid sleeve member, an impact absorbing member interposed between the inner member and outer sleeve member filling the annular space therebetween and a resilient end wall means interconnecting and sealing said inner member and outer member. The impact absorbing member together with the inner and outer members are resilient wall means defines two spaced fluid chambers and two restricted passageways connecting said fluid chambers. The chambers and passageways contain an incompressible fluid. Disposed within at least one restricted passageway is a flow control means for controlling the resistance to flow of the fluid between the chambers.

14 Claims, 2 Drawing Sheets

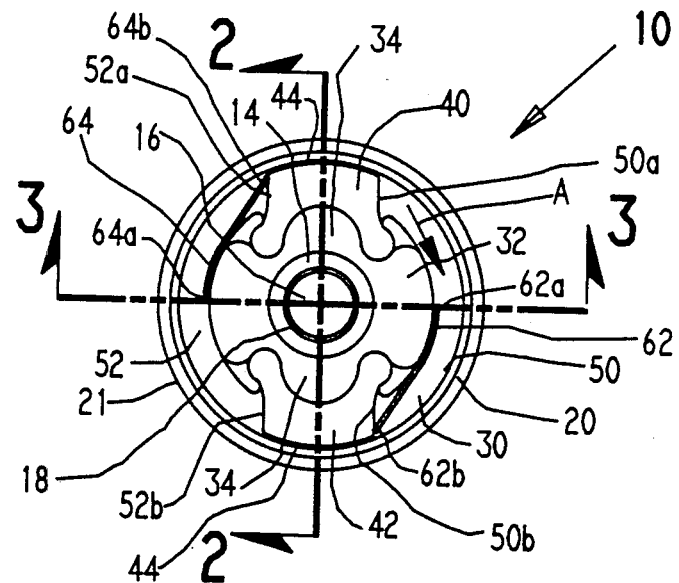
FIGURE 1
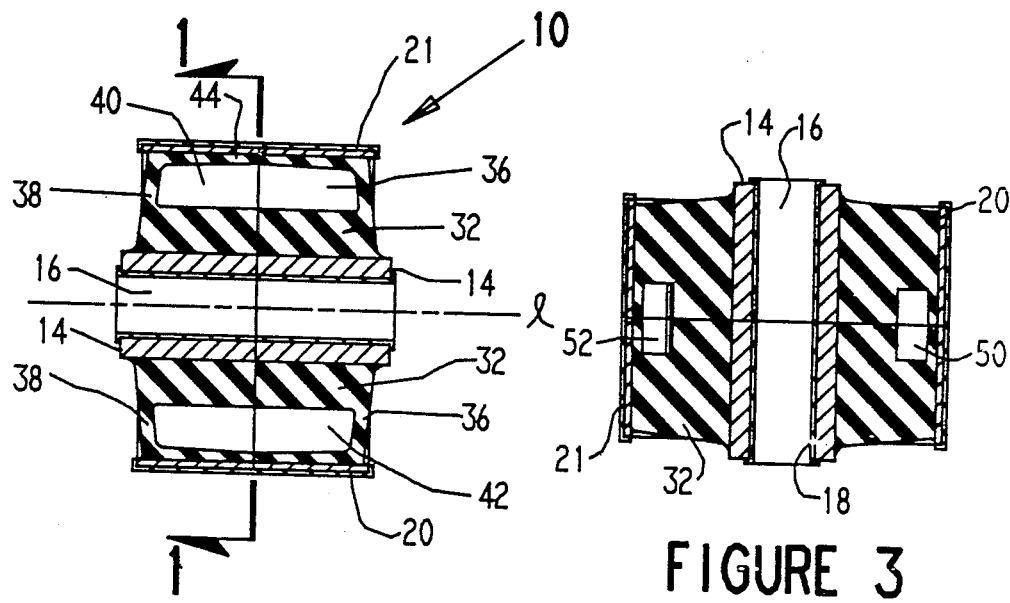
FIGURE 2
FIGURE 3

4,822,010

FLUID FILLED RESILIENT BUSHING

FIELD OF THE INVENTION

The present invention relates to a fluid filled resilient bushing assembly, and more particularly the present invention relates to fluid filled resilient bushing assemblies for use in torque struts and suspension components.

BACKGROUND OF THE INVENTION

One concern in vehicular transportation is the reduction of vibrations and isolation of the passenger compartment from such vibrations. Two particular systems to reduce such vibrations are automotive suspension systems and mountings for engines. A front end suspension system is made up of various arms, rods, links, etc. which are connected together by means such as a bushing assembly. Bushing assemblies function to dampen out vibrations of the suspension system, induced, for example, by road surfaces. Such vibrations may comprise a range of amplitudes and frequencies.

In many front wheel drive automobiles, the engine is mounted transversely in the engine compartment and is supported on mounts and connected to a transverse frame component of the automobile by means of a torque strut. The torque strut functions to control displacements of the engine as well as dampen out vibrations which vary over a wide range of amplitudes and frequencies.

Known suspension system components and torque struts generally include an elongate member having at least at one end a bushing assembly for receiving connecting bolts. In torque struts, such bushing assemblies are mounted at both ends of the strut. Rubber bushings comprising annular elongate inner and outer members with elastomer disposed therebetween are well-known and are used to control movement but have limited capability in damping vibrations of low or high frequencies. Damping of vibrations of low or high frequencies occurs when an offsetting vibratory motion is generated within the bushing assembly that acts to cancel out the undesired vibratory motion. Elastomer of differing hardness can be used to effect damping due to the hysteresis property of rubber. For example, high durometer elastomers can be used to offset large low frequency radial motions between the inner and outer members and low durometer or soft elastomers can be used to offset small high frequency radial motions between the inner and outer members of the bushing. However, in general, rubber bushings can be said to have a constant spring rate and provide little or no damping.

One type of bushing assembly to overcome these shortcomings and provide suitable damping for some frequencies of vibratory motion are fluid filled bushings. Fluid filled bushings generally include a cylindrical elongate inner rigid member, an elongate outer rigid sleeve member concentrically disposed and radially spaced from the inner member and a resilient means disposed between the inner member and outer sleeve member wherein the resilient means defines a pair of diametrically opposed fluid filled chambers fluidly connected by an elongate restricted passageway. In operation, in response to vibratory motions between the inner member and outer sleeve member, fluid is displaced from one chamber via the restricted passageway to the second chamber in a direction opposite to the vibratory motion. In particular, when a first chamber is contracted the fluid is displaced therefrom through the restricted passageway to an expanding second chamber. In the reverse cycle of the vibratory motion, when the first chamber is expanding and the second chamber is contracting the fluid is reversibly moved through the restricted passageway. As can be seen, an oscillatory motion of the fluid is generated within the restricted passageway. The restricted passageway has a certain volume confining the fluid, wherein there is a mass of fluid. The oscillatory fluid in the restricted passageway creates a mass like resistance to the pumping forces of the chambers resulting in damping of the vibratory motions. The sizing of the restricted passageway allows the bushing to be designed, or tuned to provide high damping or dynamic stiffness in the frequency range from about 150 to 200 Hertz. It can be said that such bushing assemblies provide for both controlled movement and damping of vibratory motions at high frequencies.

For a more general discussion of the operational characteristics of fluid filled isolators, reference is made to an article entitled *A New Generation of Engine Mounts,* by Marc Bernuchon, SAE Technical Paper Series 840259, 1984, the disclosure of which is incorporated by reference herein.

An example of a fluid filled bushing is disclosed in U.S. Pat. No. 3,642,268. The bushing there disclosed utilizes hydraulic fluid displaceable between two chambers via a restricted orifice. The chambers are located in the bushing along a first radial direction whereas along a second radial direction perpendicular to the first radial direction is a solid rubber member. Such a bushing exhibits high stiffness and low damping along the second radial direction and low stiffness and high damping along the first radial direction dependent on the flow characteristics between the chambers and the fluid properties as described heretofore. Other representative patents disclosing similar bushings include U.S. Pat. Nos. 3,698,703; 4,588,174; 4,605,207; 4,630,806; 4,667,942 and 4,377,216.

While the fluid filled bushings disclosed in the referenced patents function satisfactorily for their intended use at limited frequencies and amplitudes, there is a need for a fluid filled bushing assembly which can function satisfactorily over a range of frequencies and amplitudes of vibration. Certain applications require damping at low amplitude in the frequency range from about 5 to about 50 Hertz in addition to the damping for high frequencies. For example, isolation of engine idle oscillations is improved by using a mount of soft or low dynamic stiffness. However, for large road induced motions which result in large amplitude, low frequency vibrations, the damping available in the fluid filled bushing as described in the '268 patent is inadequate to provide damping in the frequency range from about 5 to about 50 Hertz.

OBJECTS OF THE INVENTION

With the foregoing in mind, a primary object of the present invention is to provide an improved fluid filled resilient bushing assembly particularly suited for connecting relatively moveable components of a vehicle.

Another object of the present invention is to provide a novel fluid filled resilient bushing assembly having different damping characteristics at excitations of low amplitude and low frequency, and at excitations of large amplitudes and low frequency.

Another object of the present invention is to provide a novel fluid filled resilient bushing assembly wherein the flow of fluid between chambers is controlled in order to induce desirable damping characteristics.

Yet another object of the present invention is to provide a novel fluid filled resilient bushing assembly wherein the flow of fluid between chambers is through at least two restricted passageways wherein the flow through the passageways can be coupled or decoupled.

SUMMARY OF THE INVENTION

More specifically, in the present invention a fluid filled resilient bushing assembly is described having an elongate inner rigid member, an elongate outer rigid sleeve member disposed about and radially spaced from the inner member to define an annular space therebetween. A resilient wall means interconnects the inner and outer members to each other adjacent opposite sides thereof. A resilient impact absorbing means is circumferentially disposed about the inner member between the inner and outer members and partially fills the annular space therein. The absorbing means together with the inner and outer members and resilient wall means defines at least two spaced chambers interconnected by at least two restricted passageways wherein at least one of the restricted passageways has a flow control means therein. An incompressible fluid is contained in the spaced chambers and restricted passageways. In one embodiment, the flow control means is effected by the insertion of a unidirectional flapper valve in at least one of the restricted passageways.

In another embodiment of the present invention, the flow control means is operative to permit the flow of fluid through the restricted passageways in response to radial motions of low amplitude between the inner and outer members and to substantially prevent the flow of said fluid through the restricted passageway in response to radial motions of high amplitude between the inner and outer members.

BRIEF DESCRIPTION OF THE DRAWINGS

The foregoing and other objects, features and advantages should become apparent from the following description when taken in conjunction with the accompanying drawings, in which:

FIG. 1 is an elevational view of a fluid filled resilient bushing assembly embodying the present invention taken at the point of abuttment of matching halves of the bushing assembly;

FIG. 2 is a cross-sectional view taken along line 2—2 of FIG. 1 showing the diametrically opposed chambers;

FIG. 3 is a cross sectional view taken along line 3—3 of FIG. 1 showing the circumferentially spaced and diametrically opposed restricted passageways;

DESCRIPTION OF THE PREFERRED EMBODIMENTS

Figure 5:
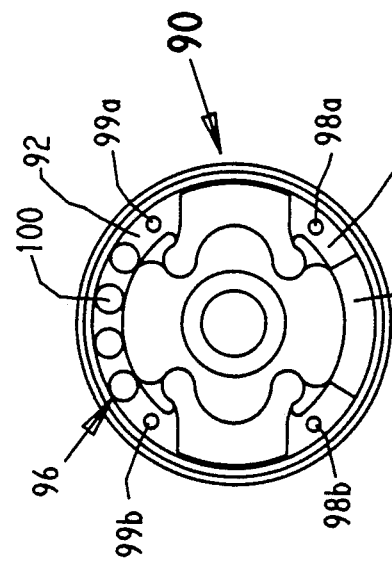
FIG. 5 is an elevational view of another modified embodiment of a fluid filled resilient bushing taken at the point of abuttment of matching halves wherein the embodiment shows other forms of decoupler blocks that may be incorporated into said restricted passageway.

Referring now to the drawings, FIG. 1 illustrates an elevational view of a fluid filled resilient bushing assembly 10 which embodies the present invention taken transversely at the point of abutment of matching halves of the assembly. For clarity, FIG. 2 illustrates a longitudinal cross-sectional view taken along 2—2 of FIG. 1 and FIG. 3 illustrates a longitudinal cross-sectional view taken along 3—3 of FIG. 1. The bushing assembly 10 includes a cylindrical elongate inner rigid member 14 having an annular bore 16 therethrough suitable to receive a member (not shown) to connect the bushing assembly 10 to an external structure. Extending through the bore 16 is a close fitting annular member 18 which is crimped about the axial outer edges of the inner rigid member 14. A cylindrical elongate outer rigid sleeve member 20 is concentrically disposed about and radially spaced from the inner member 14 to define an annular space therebetween. A close fitting annular member 21 encircles the outer rigid sleeve member 20 and is crimped about the axial outer edges thereof. The close fitting annular members 18, 21 are incorporated into the present embodiment to sealingly fit two matching halves of the bushing assembly 10 together.

As best shown in FIG. 2, a resilient impact absorbing means 32 and resilient wall means 36, 38 are disposed between the inner rigid member 14 and the outer rigid sleeve member 20. In the present invention the resilient impact absorbing means 32 and resilient wall means 36, 38 are molded of elastomeric material in unitary pieces suitable for the respective halves as shown in FIG. 2 to the left or right of section 1—1. However, in other embodiments, the resilient wall means 36, 38 may be molded independent and separate to the resilient impact absorbing means 32 wherein a gap may exist between the respective molded parts.

Each resilient wall means 36, 38 interconnects and seals together the inner member 14 and the outer sleeve member 20 at each axial end thereof as shown in FIG. 2. The resilient wall means 36, 38 are sized by thickness. In the present embodiment the thickness of each resilient wall means ranges from about 0.020 to about 0.250 inches in thickness.

The resilient impact absorbing means 32 is very stiff along one radial axis depicted by 3—3 in FIG. 1 and tunable along a second radial axis depicted by 2—2 in FIG. 1 which is perpendicular to the first radial axis. The resilient impact absorbing means 32 is designed to allow greater movement along the second radial axis than the first radial axis.

In the present embodiment as shown in FIG. 1, the resilient impact absorbing means 32 includes a pair of snubbing portions 34 projecting radially outwardly from and diametric about the inner member along 2—2. Each snubbing portion 34 acts to restrain the relative displacement of the inner member 14 and the outer sleeve 20 resulting in a buffering action of the resilient impact absorbing means 32 when such displacement is excessive.

A pair of spaced resilient chambers 40, 42 and at least two restricted passageways 50, 52 fluidly interconnecting the two chambers are defined by the resilient wall means 36, 38, the resilient impact absorbing means 32 and a resilient means 44 disposed adjacent and secured to the rigid sleeve member 20. As shown in FIG. 2, the chambers 40, 42 are diametrically opposed about the inner rigid member 14 and each chamber is elongate along and parallel to the longitudinal axis 1 of the assembly 10.

As best seen in FIG. 1, the restricted passageways 50, 52 are circumferentially spaced and diametrically opposed about the inner rigid member 14 and each restricted passageway is arcuate, having a substantially uniform circular cross section throughout its entire length. Each restricted passageway 50, 52 has a port 50(a), 52(a) at one end opening into the first chamber 40 and a port 50(b), 52(b) at its opposite end opening into the second chamber 42. The pair of chambers 40, 42 and the restricted passageways 50, 52 are filled with a substantially incompressible working fluid not shown such as a mixture of ethylene glycol and water. The dimensions of the restricted passageway affect the mass of fluid contained therein and affects the resonant frequency of the fluid effect of the bushing assembly 10 by effecting the resistance to the flow between the two chambers. Preferably, each restricted passageway has a length to diameter ratio from about 4:1 to about 20:1.

During operation, motions induce oscillating movement of the inner member 14 relative to the outer sleeve 20, causing the working fluid to oscillate in the restricted passageways 50, 52 between the first chamber 40 and the second chamber 42. In some applications it is desirable that the restricted passageways 50, 52 have unidirectional flow. Such motion may occur over a wide range of amplitudes and frequencies. In other applications, it is desirable for one or both restricted passageways 50, 52 to be relatively active at small amplitudes (i.e., less than 0.1 mm) of excitation, and inactive at higher amplitudes (i.e., greater than 1.0 mm) of excitation over a range of frequencies. In particular, a flow control means in a first restricted passageway is operative to permit the flow of the fluid through the first restricted passageway in response to radial motions of low amplitude (i.e., less than 0.1 mm) between the inner and outer members while having substantially less flow through the second restricted passageway not having the flow control means. At radial motions of high amplitude (greater than 1.0 mm) between the inner and outer members, the flow control means substantially limits the flow of the fluid through the first restricted passageway while the fluid flows between the two chambers via the second restricted passageway. A flow control means operative in this fashion is generally referred to as a decoupler means.

The present invention satisfies the aforementioned limitations of controlling the flow of fluid through the restricted passageways by providing a flow control means in at least one restricted passageway. In one embodiment, such a flow control means provides desirable decoupling of the restricted passageway at small amplitudes of excitation. The overall effect of this flow control means is to shift the minimum stiffness to a higher frequency which has the utility of controlling interior noise levels throughout the normal driving speed ranges. In another embodiment a flow control means such as a flapper valve may provide for control of flow of fluid in one circular direction. This arrangement essentially increases the effective length of the restricted passageway.

Referring again to the drawings, FIG. 1 illustrates a bushing assembly having two flapper valves 62, 64 according to the present invention. Each restricted passageway 50, 52 contains a unidirectional flapper valve 62, 64 as shown. Each flapper valve 62, 64 has a thin rectangular cross section extending across the rectangular diameter of the restricted passageway as shown in FIG. 1. Each flapper valve 62, 64 has one end 62(a), 64(a) secured to the resilient impact absorbing means 32 and a second end 62(b), 64(b) located adjacent to the resilient means 44 disposed adjacent the rigid sleeve member 20 in order to allow the working fluid to flow in a direction "A" and to be substantially sealing tight stopping flow of the working fluid in the direction opposite to "A". Preferably, each flapper 62, 64 is made of flexible metal material such as beryllium copper shim material.

In operation of the above described embodiment, when the working fluid is forced from one chamber to another chamber by radial displacement of the inner member 14 relative to the outer sleeve member 20, the fluid flows from one chamber to the other chamber in one direction in each restricted passageway 50, 52. In such a configuration the flapper valves 62, 64 operate to change the restricted passageways from operating in parallel to operating in series. The change from parallel operation to series operation of the restricted passageways results in a reduction in the apparent fluid resonant frequency within the respective chambers. Each flapper valve can be designed providing for a certain amount of leakage to control the effect of the flapper valve.

Figure 4:
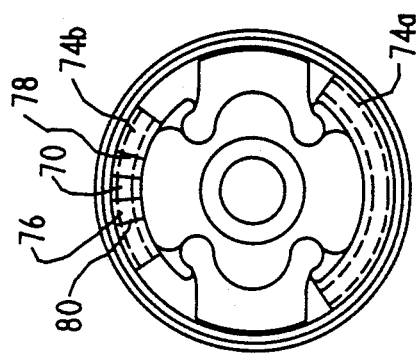
FIG. 4 is an elevational view of a modified embodiment of a fluid filled resilient bushing assembly taken at the point of abuttment of matching halves wherein the embodiment has a restricted passageway having a decoupler block and the length of the unimpeded restricted passageway is greater than that of the restricted passageway containing the decoupler block.

In another embodiment of the present invention the flow control means is operative to permit the flow of the fluid through the restricted passageway having the flow control means disposed therein in response to radial motions of low amplitude (less than 0.1 mm) between said inner and outer members and to substantially prevent the flow of the fluid through the restricted passageways in response to radial motions of high amplitude (greater than 1.0 mm) between the inner and outer members. Such a control means is referred to as a decoupler means. Various forms of decoupler means are shown in FIGS. 4 and 5. In particular, in FIG. 4 the bushing 110 has two restricted passageways 74a and 74b wherein each passageway has a reduced central section 75a, 75b. One passageway 74a forms a primary restricted passageway. The secondary restricted passageway 74b comprises three portions as illustrated in FIG. 4 from left to right: (a) a first portion indicated as 174b; (b) a recessed or enlarged cavity 76 adjacent the first portion 174b; and (c) a second portion indicated as 274b that is adjacent the recessed cavity 76. The first and second portions 174b, 274b are of substantially the same length and rectangular cross section whereas the rectangular cross section of the recessed cavity 76 is greater than the rectangular cross section of either the first or second portions 174b, 274b. A first port 80 forms the opening between the first portion 174b and the recessed cavity 76 and a second port 78 forms the opening between the second portion 274b and the recessed cavity 76.

Contained within the recessed cavity 76 is a decoupler member 70. In the present embodiment, the decoupler member 70 is rectangular in plan and fits into the recessed cavity 76 allowing for movement between the two ports 78, 80. The decoupler member 70 has an outer rectangular peripheral portion located adjacent to the inner peripheral wall of the recessed cavity 76 but having a slight clearance therefrom allowing for the decoupler member 70 to oscillate. The rectangular cross section size of the decoupler member 70 is greater than the rectangular cross section size of the first or second portions 174b, 274b. In the embodiment shown in FIG. 4, the decoupler member 70 is shaped wherein when pushed against either port 78, 80 the port is blocked allowing no fluid flow through the restricted passageway 74b. Preferably the decoupler member 70 is molded of elastomeric material. It is understood that in some other embodiments the decoupler member may be perforate.

As shown in FIG. 4 the length of the secondary restricted passageway 74b is from about 50 to about 75% the length of the primary restricted passagewaty 74a. The increased length of the primary restricted passageway 74a provides sufficient inertia against flow through the primary restricted passageway during vibrations of low amplitudes between the inner and outer member, allowing for more flow to go through the secondary restricted passageway 74b.

In operation, the decoupler member 70 cooperates with the primary passageway 74a to automatically couple and decouple the primary passageway with the chambers. For instance, at low amplitude of vibration, the decoupler member simply oscillates in the recessed cavity 76, in response to fluid flow oscillations between the chambers 40, 42 and the primary passageway 74a is relatively quiescent, or decoupled. At greater amplitudes of vibration, however, the decoupler member 70 seats against a port 78, 80 thereby blocking the flow of fluid through the passageway 74b and thereby requiring all fluid to flow in the passageway 74a between the two chambers.

To accomplish this decoupling, the amount of inertia of the fluid through the primary restricted passageway 74a must be greater than the inertia of the fluid through the secondary restricted passageway 74b. One method to affect the greater inertia in the primary restricted passageway is to increase the length thereof. Another method is to reduce the cross section area. Other sizings of the primary passageway may be incorporated to accomplish the same affect.

At low frequencies of vibration (from about 5 to about 20 Hertz) a bushing according to the present invention has about the same stiffness whether the amplitude is 0.1 mm or 1 mm resulting from the oscillation of the decoupler member. As the frequency of the vibration increases beyond about 20 Hertz, the primary restricted passageway 74a remains decoupled at an amplitude of about 0.1 mm. However, at higher amplitudes, such as 1 mm, the stiffness of the bushing assembly increases markedly, indicating that the decoupler member 70 stops or throttles flow through the secondary restricted passageway 74b and thereby forcing the flow through the primary restricted passageway 74a.

Two other embodiments which change the effective inertia of the passageway and improve the decoupler means are shown in bushing assembly 90 of FIG. 5. For brevity, two decoupler members 94, 96 are shown in one bushing assembly whereas in actuality each means would probably be used in a secondary restricted passageway as shown in FIG. 4. Decoupler member 94 comprises an auxiliary mass element, preferably a rectangular block fabricated of a metallic material such as brass, steel, or aluminum. The auxiliary mass element 94 is located and moveable within the restricted passageway 91 between two molded stops 98a, 98b each stop being located at opposite ends of said restricted passageway 91. Preferably the decoupler member 94 has a length up to about 80% of the length between the two molded stops 98a, 98b. In operation, the mass element 94 oscillates between the stops 98a, 98b at lower frequencies of vibration and is limited in travel by the stops at high amplitudes creating substantial blockage within the restricted passageway causing a desirable increase in mount stiffness. Decoupler member 96 comprises four metal spherical balls 100 located and moveable within the passageway 92 between two stops 99a, 99b is another embodiment of decoupler means within the scope of the present invention.

The manufacture of fluid filled bushing assemblies is well-known to those skilled in the art and may be accomplished by several different methods. The fluid filled bushing assemblies of the present invention are manufactured by separately manufacturing two halves one of which is shown in FIG. 1. The manufacture of each half is similar wherein manufacture of one half will be described. The inner member 14 and outer sleeve 20 are formed according to standard metal working methods where after parts are cleaned, and a primer and suitable rubber to metal adhesive is applied to surfaces to which rubber will be bonded. The inner member 14 and sleeve member 20 are placed in a mold which is then placed in a rubber injection vulcanizing press. The mold is preheated to suitable curing temperature dependent on the rubber used. The rubber is injected to form the resilient impact absorbing means 32, resilient wall means 36, 38 and resilient means 44 on the inside of the outer rigid sleeve. The bushing assembly half 10 is demolded, cleaned and readied for assembly. The flow control means such as a flapper valve 62 is then inserted. The chambers 40, 42 of the two opposite halves are then filled with incompressible fluid by assembling the two mold halves in a fluid bath wherein the two halves are fluid sealed. A method used to fluidly seal the two halves is to use a close fitting member 18 inside the inner member and crimping the member 18 around the end surfaces of the inner member and similarly attaching a close fitting member 21 around the end surfaces of the sleeve member 20.

Figure 6:
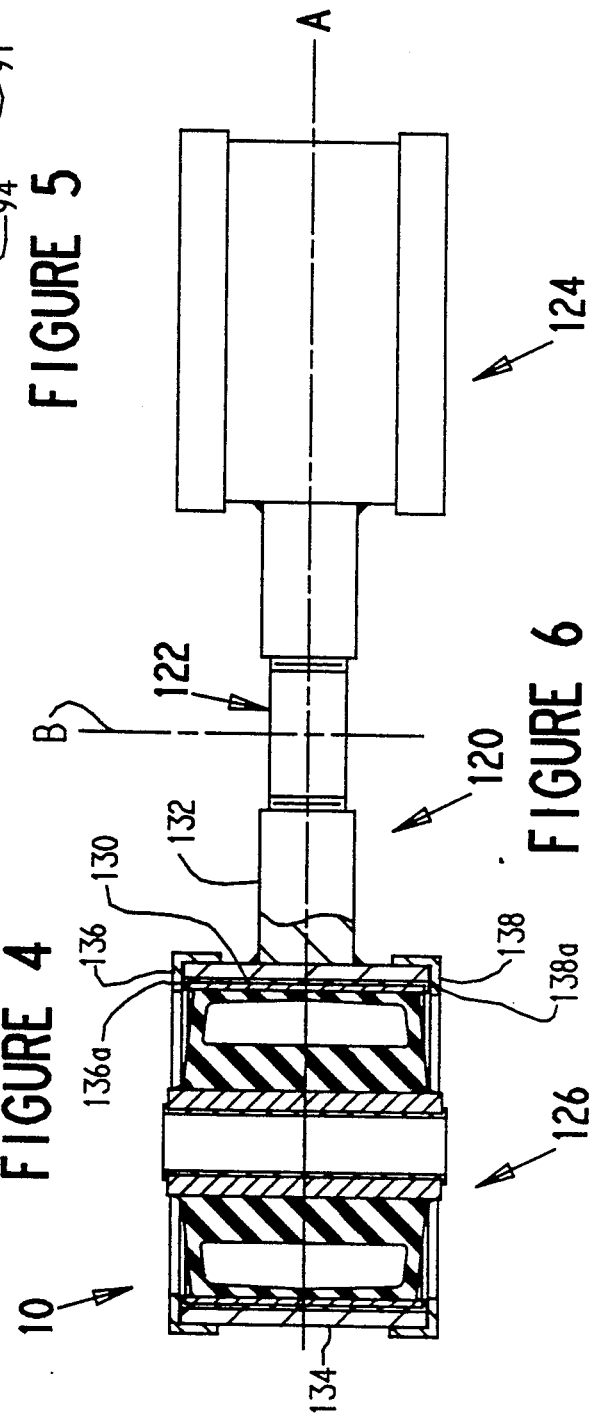
FIG. 6 is a combination of a plan view and a cross-sectional view of a torque strut embodying a resilient bushing assembly of the present invention.

The fluid-filled bushing assembly 10 is suitably used, for example, in a torque strut 120 as shown in FIG. 6. The torque strut is symmetrical with respect to an elongate axis A passing centrally through the strut 120 and with respect to a transverse axis B. The torque strut 120 has a connecting portion 122 located between a right-hand portion 124 and a left-hand portion 126 as viewed in FIG. 6. The two portions 124, 126 are generally identical, such that reference will be made to only the left-hand portion 126 for brevity. The left-hand portion 126 comprises a strut body 130 and a fluid-filled bushing assembly 10 which is contained by the strut body 130. The strut body 130 comprises an arm 132 that is threadedly secured to the connecting portion 122. An elongate aperture 134 is affixed to the arm 132. The bushing assembly 10 is inserted into the aperture 134 and secured therein by a top member 136 and a bottom member 138 each threadedly attached to the elongate aperture 134. Each of the top members 136 and bottom member 138 have a lip 136a, 138a, extending over the outer sleeve of the bushing to hold the bushing in place.

In view of the foregoing, it should be apparent that the present invention now provides an improved strut which is capable of resilient accommodating an acceptable amount of endwise motion and while providing damping of endwise motion in a selected frequency range. Thus, when used to connect an engine to a frame component in an automobile, the strut softly accommodates engine oscillations at idle speed while stiffly resisting engine oscillations of a greater magnitude. The symmetry of the strut, and the commonality of its components, enables it to be manufactured economically by high speed mass production techniques.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid filled resilient bushing assembly for vibration control comprising
   an elongate inner rigid member;
   an elongate outer rigid sleeve member concentrically disposed about and radially spaced from said inner member to define an annular space therebetween;
   a resilient wall means interconnecting and sealing said inner and outer members to each other adjacent opposite ends thereof;
   a resilient impact absorbing means circumferentially disposed about said inner member between said inner and outer members and partially filling the annular space therebetween;
   said absorbing means together with said inner and outer members and resilient wall means defining at least two spaced chambers interconnected by at least two restricted passageways;
   an incompressible fluid filling said spaced chambers and restricted passageways; and
   unidirectional flapper valves in each of said restricted passageways which cooperate to permit flow through said passageways circumferentially about said inner member between said chambers.

2. A fluid filled resilient bushing assembly according to claim 1 wherein said chambers are diametrically opposed.

3. A fluid filled resilient bushing assembly according to claim 2 wherein said restricted passageways are circumferentially spaced and diametrically opposed.

4. A fluid filled resilient bushing assembly according to claim 1 wherein said impact absorbing means is elastomer and includes snubbing portions projecting radially outwardly from said inner member into said chambers.

5. A fluid filled resilient bushing assembly according to claim 1 wherein each of said restricted passageways has a length to diameter ratio from about 4:1 to about 20:1.

6. A fluid filled resilient bushing assembly for vibration control comprising
   an elongate inner rigid member;
   an elongate outer rigid sleeve member concentrically disposed about and radially spaced from said inner member to define an annular space therebetween;
   a resilient wall means interconnecting and sealing said inner and outer members to each other adjacent opposite ends thereof;
   a resilient impact absorbing means circumferentially disposed about said inner member between said inner and outer members and partially filling the annular space therebetween;
   said absorbing means together with said inner and outer members and resilient wall means defining at least two spaced diametrically opposed chambers interconnected by at least two diametrically opposed restricted passageways;
   an incompressible fluid filling said spaced chambers and restricted passageways; and
   flow control means disposed within each restricted passageway comprising unidirectional flapper valves which cooperate to permit flow through said passageway circumferentially about said inner member between said chambers.

7. A fluid filled resilient bushing assembly according to claim 6 wherein each restricted passageway has a length to diameter ratio from about 4:1 to about 20:1.

8. A fluid filled resilient bushing assembly according to claim 6 wherein said impact absorbing means is elastomer and includes snubbing portions projecting radially outwardly from said inner member into said chambers.

9. A fluid filled resilient bushing assembly for vibration control comprising
   an elongate inner rigid member;
   an elongate outer rigid sleeve member concentrically disposed about and radially spaced from said inner member to define an annular space therebetween;
   a resilient wall means interconnecting and sealing said inner and outer members to each other adjacent opposite ends thereof;
   a resilient impact absorbing means circumferentially disposed about said inner member between said inner and outer members and partially filling the annular space therebetween;
   said absorbing means together with said inner and outer members and resilient wall means defining at least two spaced diametrically opposed chambers interconnected by at least two diametrically opposed restricted passageways and said absorbing means further defines snubbing portions projecting radially outwardly from said inner member into said chambers;
   an incompressible fluid filling said spaced chambers and restricted passageways; and
   flow control means disposed within at least one of said restricted passageways wherein said flow control means is operative to permit the flow of said fluid through said restricted passageway in response to radial motions of low amplitude between said inner and outer members and to substantially prevent the flow of said fluid through said passageway in response to radial motions of high amplitude between said inner and outer members.

10. A fluid filled resilient bushing assembly according to claim 9 wherein said impact absorbing means is elastomer and includes snubbing portions projecting radially outwardly from said inner member into said chambers.

11. A fluid filled resilient bushing assembly according to claim 9 wherein said restricted passageway containing the flow control means has a length from about 50% to about 75% the length of the restricted passageway free of a flow control means.

12. A fluid filled resilient bushing assembly according to claims 9 or 11 wherein said flow control means comprises a decoupler member positioned within said restricted passageway so said decoupler member can oscillate within said restricted passageway in response to radial motions of low amplitude and to create substantial blockage within said restricted passageway in response to radial motions of high amplitude.

13. A fluid filled resilient bushing assembly according to claims 9 or 11 wherein said restricted passageway containing said flow control means comprises a first portion having a cross-sectional area, a second portion spaced from said first portion and having a cross-sectional area substantially equal to that of the first portion and a recessed cavity disposed between said first and second portions having a cross-sectional area greater than said cross-sectional areas of said first or second portions, and wherein said flow control means is a decoupler member positioned within said recessed cavity and having a cross sectional area greater than that of the first or second portions said decoupler member being free to oscillate within said recessed cavity in response to radial motions of low amplitude and to substantially block said restricted passageway in response to radial motions of high amplitudes.

14. A fluid filled resilient bushing assembly according to claims 9 or 11 wherein said restricted passageway containing said flow control means comprises stop means located at each end of said restricted passageway and said flow control means is a mass element located within said passageway and moveable between said stop means such that said mass element can oscillate between said stop means.

* * * * *